(12) United States Patent
Yan et al.

(10) Patent No.: US 11,912,083 B2
(45) Date of Patent: Feb. 27, 2024

(54) SPRING DAMPER BEARING AND SPRING DAMPER BEARING ASSEMBLY

(71) Applicant: Schaeffler Technologies AG & Co. KG, Herzogenaurach (DE)

(72) Inventors: Liuqing Yan, Shanghai (CN); Yong Wu, Suzhou (CN); Xiangyang Yu, ShangHai (CN); Christian Nuissl, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 144 days.

(21) Appl. No.: 17/605,605

(22) PCT Filed: Apr. 28, 2019

(86) PCT No.: PCT/CN2019/084850
§ 371 (c)(1),
(2) Date: Oct. 22, 2021

(87) PCT Pub. No.: WO2020/220171
PCT Pub. Date: Nov. 5, 2020

(65) Prior Publication Data
US 2022/0203791 A1    Jun. 30, 2022

(51) Int. Cl.
*B60G 15/06* (2006.01)
*F16C 33/76* (2006.01)

(52) U.S. Cl.
CPC ............ *B60G 15/068* (2013.01); *F16C 33/76* (2013.01); *B60G 2204/418* (2013.01); *F16C 2326/05* (2013.01)

(58) Field of Classification Search
CPC ........ F16C 33/76; F16C 33/80; F16C 33/805; F16C 2326/05; B60G 15/067; B60G 15/068; B60G 2204/418; F16F 9/38
See application file for complete search history.

(56) References Cited

U.S. PATENT DOCUMENTS

| | | | |
|---|---|---|---|
| 8,992,094 B2 | 3/2015 | Stautner et al. | |
| 10,518,598 B1* | 12/2019 | Shaikh | F16C 33/7853 |
| 2012/0213464 A1 | 8/2012 | Rainer et al. | |
| 2016/0223023 A1* | 8/2016 | Lee | F16C 19/163 |
| 2016/0243915 A1 | 8/2016 | Bedeau et al. | |

(Continued)

FOREIGN PATENT DOCUMENTS

| | | |
|---|---|---|
| CN | 102470715 A | 5/2012 |
| CN | 103423312 A | 12/2013 |

(Continued)

*Primary Examiner* — Alan B Waits

(57) ABSTRACT

A spring damper bearing includes a bearing cap, a guide ring and a thrust bearing. The bearing cap and the guide ring are connected together and surround the thrust bearing. The bearing cap includes an annular main body portion and a barrier part which is located on an inner circumferential side of the main body portion. The barrier part has an annular shape and includes an outer circumferential end connected to the main body portion and an inner circumferential end which extends out from the outer circumferential end and is away from the main body portion. The inner circumferential end is nearer than the outer circumferential end to the lower axial side and the inner radial side of the spring damper bearing.

9 Claims, 1 Drawing Sheet

(56) References Cited

U.S. PATENT DOCUMENTS

2017/0008362 A1\* 1/2017 Murakami ........... B60G 15/068
2017/0261032 A1 9/2017 Lepine et al.

FOREIGN PATENT DOCUMENTS

| | | | |
|---|---|---|---|
| CN | 105705822 | A | 6/2016 |
| CN | 105966184 | A | 9/2016 |
| CN | 106103146 | A | 11/2016 |
| CN | 106151292 | A | 11/2016 |
| CN | 107178555 | A | 9/2017 |
| CN | 105705822 | B | 11/2018 |
| DE | 102011004334 | A1 | 8/2012 |
| DE | 102012215912 | A1 | 3/2014 |
| DE | 102015209776 | A1 | 12/2016 |
| FR | 2990252 | A1 | 1/2013 |
| JP | 09119474 | A | 5/1997 |
| JP | 2004132538 | A | 4/2004 |
| WO | 2015136346 | A1 | 9/2015 |

\* cited by examiner

SPRING DAMPER BEARING AND SPRING DAMPER BEARING ASSEMBLY

CROSS-REFERENCE TO RELATED APPLICATIONS

This application is the U.S. National Phase of PCT Appln. No. PCT/CN2019/084850 filed Apr. 28, 2019, the entire disclosure of which is incorporated by reference herein.

TECHNICAL FIELD

The disclosure relates to the field of bearings, in particular to a spring damper bearing used for a spring damper.

BACKGROUND

A spring damper bearing is also called a suspension strut bearing (a plane bearing), which is a part of a wheel suspension in a single-wheel suspension. Common spring damper bearings are for example bearings used for McPherson spring dampers. For example, Chinese Patent No. CN105705822B discloses a spring damper bearing, and German Patent No. DE102012215912A1 discloses a suspension strut bearing, which are incorporated herein by reference in their entirety, for various purposes.

FIG. 1 shows a schematic cross-sectional view of a spring damper bearing 10, a damper cover 30 and a dust cover 20 installed together.

The spring damper bearing 10 (hereinafter referred to as the bearing 10) mainly comprises a cap 11, a guide ring 12 and a thrust bearing. The cap 11 has a first buckle 111, and the guide ring 12 has a second buckle 121. The first buckle 111 and the second buckle 121 are locked with each other in shape to form a snap-fitting part so that the cap 11 and the guide ring 12 are snap-fitted together. The thrust bearing is disposed between the cap 11 and the guide ring 12. The thrust bearing mainly comprises an upper seat ring 13, a lower seat ring 14, rolling elements 15 and a retainer.

The cap 11 is connected to the damper cover 30 in the form of an interference fit, and the guide ring 12 is connected to the dust cover 20 in the form of an interference fit. The dust cover 20 is flexible and is provided as a cylindrical-shaped sleeve on the inner circumference of the guide ring 12. Due to the squeezing force of the interference fit, the end of the dust cover 20 which is close to the bearing 10 is close to the inner radial side and deformed. As a result, a gap with a wedge-shaped axial section is formed between the dust cover 20 and the bearing 10, as shown in the shaded portion in FIG. 1.

Since a vehicle may encounter water during use, taking the upper portion of FIG. 1 as a basis of reference, as shown by the hollow arrow in FIG. 1, water can enter the inner radial area of the bearing 10 from the upper portion of the cap 11, and also can enter the inner radial area of the bearing 10 from the lower portion of the dust cover 20. Water entering the inner radial area of the bearing 10 may accumulate in the wedge-shaped gap. In other words, the wedge-shaped gap constitutes a water accumulation gap. When the water level of the above water accumulation gap exceeds the height of the snap-fitting part formed by the first buckle 111 and the second buckle 121, water may further enter the thrust bearing. That is, water may contact the upper seat ring 13, the lower seat ring 14 and rolling elements 15, which is detrimental to the normal operation of the thrust bearing. In addition, the axial end surface, installed with the damper cover 30 in a fitting manner, of the bearing 10 shown in FIG. 1 is an inclined surface (the inclined surface structure helps to counteract the lateral force generated by the spring of the damper). After the installation of the bearing 10 is completed, an included angle is formed between the axis of the bearing 10 and the axis of the damper cover 30. At this time, for example, the axial direction of the damper cover 30 is close to the vertical direction, while the deflection angle of the axis of the bearing 10 from the vertical direction is δ (FIG. 1 shows the deflection angle δ of the end surface of the bearing 10 in the axial direction from the horizontal plane). In this case, water accumulated in the water accumulation gap is more likely to enter the thrust bearing.

SUMMARY

It is desirable to provide a spring damper bearing and a spring damper bearing assembly that can reduce the risk of water entering the thrust bearing in order to overcome or at least alleviate the above shortcomings of the prior art.

A spring damper bearing includes a bearing cap, a guide ring and a thrust bearing. The bearing cap and the guide ring are connected together and surround the thrust bearing, wherein the bearing cap comprises an annular main body portion and a barrier part which is located on an inner circumferential side of the main body portion, the barrier part has an annular shape and comprises an outer circumferential end connected to the main body portion and an inner circumferential end which extends out from the outer circumferential end and is away from the main body portion, and the inner circumferential end is nearer than the outer circumferential end to the lower axial side and the inner radial side of the spring damper bearing.

The outer circumferential end of the barrier part may be connected to the inner circumferential wall of the main body portion.

The inner circumferential end may be the innermost radial part of the bearing cap.

The barrier part may be tapered.

The barrier part may be formed by an injection molding process.

The barrier part and the main body portion may be made of the same material.

The barrier part may be connected to the main body portion through an adhesive bonding technology, or the barrier part and the main body portion may be integrally formed.

The hardness of the material composing the barrier part may be lower than that of the material making the main body portion.

A spring damper bearing assembly includes a damper cover, a dust cover, and a spring damper bearing. The damper cover is connected to the bearing cap. The dust cover is connected to the guide ring. A gap is formed between the dust cover and the guide ring. The barrier part of the bearing cap is used to block water from entering the gap.

The diameter of the inner circumferential end may be less than that of the proximal end, close to the bearing, of the dust cover.

A gap may be left between the inner circumferential end and the dust cover in an initial installation state.

In the spring damper bearing, the water entering the inner radial area of the bearing is blocked on the inner radial side of the barrier part by the barrier part located on the inner radial side of the main body portion of the bearing cap, thereby reducing the risk of water entering the thrust bearing.

DETAILED DESCRIPTION

Exemplary implementations of the spring damper bearing assembly are described below with reference to the drawings. It should be understood that these specific descriptions are only used to teach those skilled in the art how to implement the spring damper bearing assembly, and are not intended to be exhaustive of all possible variations.

Figure 1:
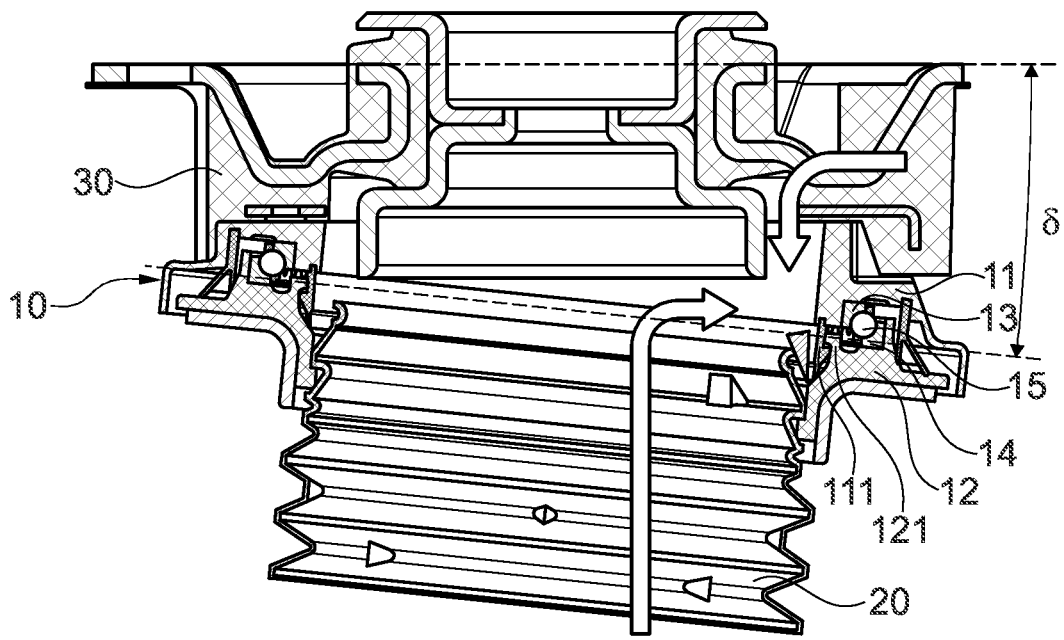
FIG. 1 shows a schematic diagram of the application of a known spring damper bearing.
Figure 2:
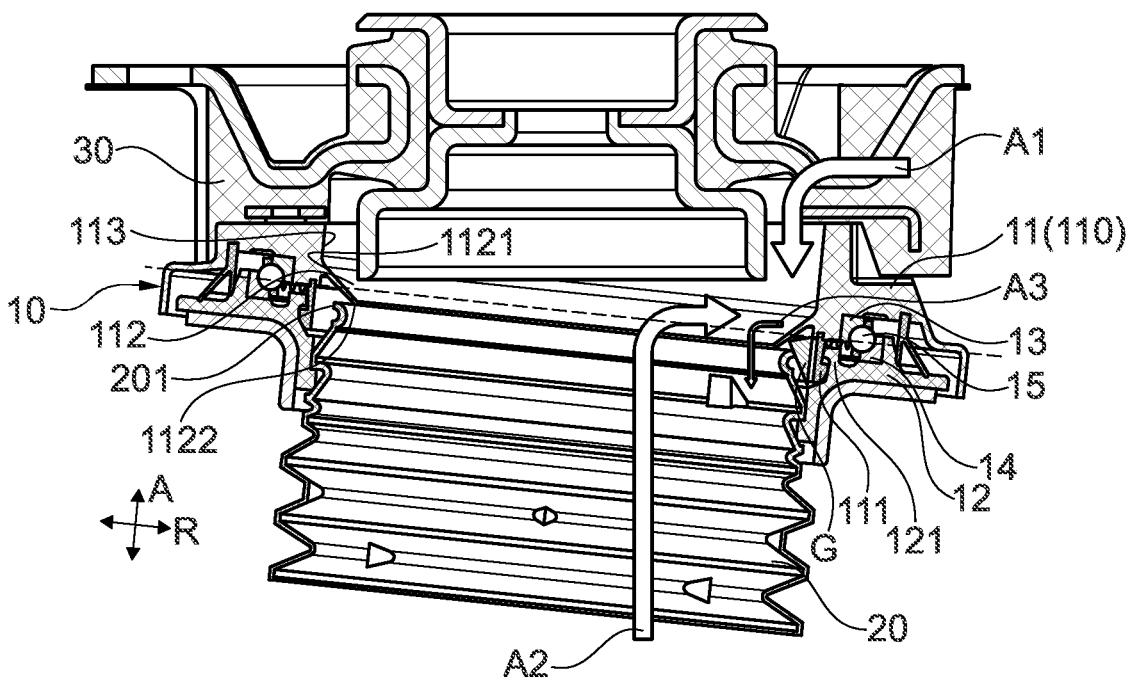
FIG. 2 shows a schematic cross-sectional view of a spring damper bearing assembly designed to prevent water intrusion.

As shown in FIG. 2, the spring damper bearing assembly includes a spring damper bearing 10 (hereinafter referred to as the bearing 10), a damper cover 30 and a dust cover 20. FIG. 2 shows a schematic cross-sectional view of the spring damper bearing assembly. In this figure, A represents the axial direction of the bearing 10, R represents the radial direction of the bearing 10, and "upper" or "lower" hereinafter is also described by reference to the orientation shown in FIG. 2.

The bearing 10 is obtained by improving the spring damper bearing in the prior art. The bearing 10 mainly comprises a cap 11, a guide ring 12 and a thrust bearing. The thrust bearing is disposed between the cap 11 and the guide ring 12. The thrust bearing comprises an upper seat ring 13, a lower seat ring 14, rolling elements 15 and a retainer. A first buckle 111 on the cap 11 and a second buckle 121 on the guide ring 12 are locked with each other in shape to form a snap-fitting part so that the cap 11 and the guide ring 12 are snap-fitted together.

The cap 11 is in an annular shape and comprises a main body portion 110 and a barrier part 112 that is located on the inner circumferential side of the main body portion 110. The outer circumferential end 1121 of the barrier part 112 is connected to an inner circumferential wall 113 of the main body portion 110 of the cap 11. The inner circumferential end 1122 of the barrier part 112 deviates from the outer circumferential end 1121 in the axial direction A. Specifically, in the process that the barrier part 112 extends from the outer circumferential end 1121 to the inner circumferential end 1122, the barrier part gradually extends towards the lower axial side (the side near the guide ring 12 in the axial direction A of the bearing 10 is the lower axial side, and the side near the cap 11 in the axial direction A of the bearing is the upper axial side) and the inner radial side in the axial direction A. That is, the inner circumferential end 1122 is nearer than the outer circumferential end 1121 to the lower axial side and the inner radial side of the bearing 10, and the barrier part 112 is one part with a tapered shape.

Preferably, in the initial installation state of the bearing 10, a gap is left between the inner circumferential end 1122 and the proximal end 201, close to the bearing 10, of the dust cover 20. As a result, during the movement of the bearing assembly, even if the positional relationship between the inner circumferential end 1122 and the proximal end 201 changes (mainly due to the disturbance of the dust cover 20), the barrier part 112 and the dust cover 20 will not interfere with each other easily.

Preferably, the inner circumferential end 1122 is located on the inner radial side of the dust cover 20 in the radial direction R. That is, the diameter of the inner circumferential end 1122 is less than the diameter of the proximal end 201 of the dust cover 20 so that water can be better blocked.

Next, the process of blocking the water in the environment from entering the gap G (as shown by the shaded portion in FIG. 2) formed between the dust cover 20 and the bearing 10 by the barrier part 112 is described, with the axial section of the gap having a wedge shape. The hollow arrows A1, A2 and A3 in FIG. 2 indicate the flow direction of water flow or water droplets from the outside. After water enters the inner radial area (as shown by arrow A1) of the bearing 10 from the upper portion of the cap 11, or enters the inner radial area (as shown by arrow A2) of the bearing 10 from the lower portion of the dust cover 20, water can flow along the inner circumferential wall 113 to the barrier part 112, or directly fall to the barrier part 112, and then flow to the inner circumferential end 1122 along the barrier part 112, before leaving the barrier part 112 (as shown by arrow A3). Since the inner circumferential end 1122 is located on the inner radial side of the dust cover 20 in the radial direction, the barrier part 112 introduces water to the inner radial area of the dust cover 20, and water flow does not easily enter the gap G located on the outer radial side of the proximal end 201.

The barrier part 112 and the main body portion 110 of the cap 11 may be integrally formed. For example, the main body portion 110 and the barrier part 112 are both made of plastic and are integrally formed by an injection molding process. In this case, the materials of the barrier part 112 and the main body portion 110 are both generally high in hardness. The barrier part 112 is not easily deformed during the normal operation of the bearing 10. In addition, the barrier part 112 may also be connected to the main body portion 110 of the cap 11 through for example an adhesive bonding technology.

In other cases, the barrier part 112 and the main body portion 110 also may be made of different materials. For example, the material hardness of the barrier part 112 is lower than the material hardness of the main body portion 110. The main body portion 110 is made of plastic with a high material hardness and is rigid. The barrier part 112 is made of plastic or rubber with a lower material hardness. The material hardness of the barrier part 112 can be between the hardness of plastic and the hardness of rubber, and the barrier part 112 has a certain flexibility. The barrier part 112 may be connected to the inner circumferential wall 113 of the main body portion 110 by means of, e.g., injection molding, adhesive bonding, or the like. In this case, the coverage range of the barrier part 112 can be large in both the axial direction and in the radial direction. For example, in the axial direction, the barrier part 112 extends into the inner space of the dust cover 20. In the radial direction, the diameter of the portion at the inner circumferential end 1122 of the barrier part 112 is significantly smaller than the diameter of the proximal end 201. During the normal operation of the bearing 10, it is possible for the barrier part 112 to touch the dust cover 20. In this process, the barrier part 112 is adaptively deformed to act as a sealing ring. The flexible barrier part 112 has a high flexibility. Even if the positional relationship between the inner circumferential end 1122 and the proximal end 201 changes, the barrier part 112 can also block water from entering the gap G in all directions.

It should be understood that, in addition to the main body portion 110, the first buckle 111, and the barrier part 112 described above, the cap 11 may also include a sealing part (a sealing lip) used for achieving a seal with the guide ring 12. The material hardness of the barrier part 112 may be lower than the material hardness of the main body portion 110. The material hardness of the barrier part 112 may be equal to or higher than the material hardness of the sealing part. For example, the barrier part 112 may be made of rubber or plastic like the sealing part, or the barrier part 112 may include rubber or plastic.

Some of the beneficial effects of the above embodiments are briefly described hereinafter.

(i) The annular barrier part 112 can block water in the environment from entering the gap G between the dust cover 20 and the bearing 10, and no water is accumulated in the gap G, thereby reducing the risk of water entering from the inner radial side of the bearing 10 to the thrust bearing.

(ii) The barrier part 112 has a simple shape and structure and is convenient to manufacture, the modification to the cap 11 in the prior art is small, and the modified cap 11 enhances the waterproofness of the bearing 10 with a low manufacturing cost.

It should be understood that the foregoing embodiments are only exemplary and are not limiting. Those skilled in the art can make various modifications and changes to the foregoing embodiments under the teaching of the present disclosure. For example, (i) Although in the embodiment shown in FIG. 2, the extension direction of the section of the barrier part 112 in the axial direction is obliquely linear, that is, the barrier part 112 is tapered, the specific shape of the barrier part 112 may vary. For example, the extension direction of the section of the barrier part 112 in the axial direction may also be in a broken-line shape or in an arc shape.

(ii) The diameter of the inner circumferential end 1122 of the barrier part 112 may also be approximately the same as the diameter of the proximal end 201 of the dust cover, and water can still be blocked from entering the gap G depending on the oblique extension posture of the barrier part 112.

(iii) The gap G between the dust cover 20 and the bearing 10 also may not be in a wedge shape, or the size of the gap G is very small in the axial and/or radial direction, and the barrier part 112 can still block water from entering the thrust bearing.

DESCRIPTION OF REFERENCE NUMERALS

10 Bearing;
11 Cap;
110 Main Body Portion;
111 First Buckle;
112 Barrier Part;
1121 Outer Circumferential End;
1122 Inner Circumferential End;
113 Inner Circumferential Wall;
12 Guide Ring;
121 Second Buckle;
13 Upper Seat Ring;
14 Lower Seat Ring;
15 Rolling Elements;
20 Dust Cover;
201 Proximal End;
30 Damper Cover;
A Axial Direction;
R Radial Direction;
G Gap.

The invention claimed is:

1. A spring damper bearing, comprising a bearing cap, a guide ring and a thrust bearing, the bearing cap and the guide ring being connected together and surrounding the thrust bearing, wherein the bearing cap comprises an annular main body portion and a barrier part that is located on an inner circumferential side of the main body portion, the barrier part is in an annular shape and comprises an outer circumferential end connected to the main body portion and an inner circumferential end extending out from the outer circumferential end and being away from the main body portion, the inner circumferential end being nearer than the outer circumferential end to a lower axial side and an inner radial side of the spring damper bearing; and the barrier part is tapered.

2. The spring damper bearing according to claim 1, wherein the outer circumferential end of the barrier part is connected to an inner circumferential wall of the main body portion.

3. The spring damper bearing according to claim 1, wherein the inner circumferential end constitutes an innermost radial part of the bearing cap.

4. The spring damper bearing according to claim 1, wherein the barrier part is formed by an injection molding process.

5. The spring damper bearing according claim 1, wherein the barrier part and the main body portion are made of a same material.

6. The spring damper bearing according to claim 5, wherein the barrier part and the main body portion are integrally formed.

7. A spring damper bearing assembly, comprising a damper cover, a dust cover and the spring damper bearing according to claim 1, the damper cover being connected to the bearing cap, the dust cover being connected to the guide ring, a gap being formed between the dust cover and the guide ring, the barrier part of the bearing cap being used to block water from entering the gap.

8. The spring damper bearing assembly according to claim 7, wherein a diameter of the inner circumferential end is less than that of a proximal end, close to the bearing, of the dust cover.

9. The spring damper bearing assembly according to claim 7, wherein the gap is left between the inner circumferential end and the dust cover in an initial installation state.

* * * * *